United States Patent [19]

Winsel

[11] Patent Number: 4,478,916

[45] Date of Patent: Oct. 23, 1984

[54] METHOD AND APPARATUS FOR OPERATING AQUEOUS GALVANIC HIGH ENERGY CELLS

[75] Inventor: Aügüst Winsel, Kelkheim, Fed. Rep. of Germany

[73] Assignee: Varta Batterie Aktiengesellschaft, Hanover, Fed. Rep. of Germany

[21] Appl. No.: 122,612

[22] Filed: Feb. 19, 1980

[30] Foreign Application Priority Data

Apr. 6, 1979 [DE] Fed. Rep. of Germany ....... 2913908

[51] Int. Cl.$^3$ ............................................ H01M 16/00
[52] U.S. Cl. .......................................... 429/9; 429/13; 429/17; 429/19
[58] Field of Search ...................... 429/13, 17, 21, 19, 429/12, 34, 9

[56] References Cited

U.S. PATENT DOCUMENTS

| | | | |
|---|---|---|---|
| 3,558,361 | 1/1971 | Christianson | 429/17 |
| 3,615,850 | 10/1971 | Chludzinski et al. | 429/17 |
| 3,911,284 | 10/1975 | Skala | 429/17 |

FOREIGN PATENT DOCUMENTS 994448 6/1965 United Kingdom.
1530214 10/1978 United Kingdom.

*Primary Examiner*—Donald L. Walton
*Attorney, Agent, or Firm*—Weiser & Stapler

[57] ABSTRACT

Galvanic high energy cells based on the aqueous system $Li/H_2O_2$ are operated in conjunction with a fuel cell. The $H_2/O_2$ gas mixture developed by the high energy cell is supplied first to the positive and then the negative electrode of the fuel cell. The required quantitative relationship of the two gases, corresponding to the stiochiometry of water, is provided either by adding $O_2$ to the gas mixture, or by separating $O_2$ by means of an $O_2/O_2$ gas chain, operating as a cleaning cell.

9 Claims, 2 Drawing Figures

METHOD AND APPARATUS FOR OPERATING AQUEOUS GALVANIC HIGH ENERGY CELLS

The invention relates to a method and apparatus for operating aqueous galvanic high energy cells having lithium and aluminum electrodes, or having electrodes of a lithium/aluminum alloy.

Galvanic high energy cells of the above-mentioned type are known for example, from British Pat. No. 1,530,214. They generally consist of a highly reactive negative alkali metal electrode and a counter electrode of inert metal, both of which are immersed in an aqueous electrolyte solution. As depolarizers for the counter electrode there can be used oxygen, hydrogen peroxide, or even water. Special measures, such as the production of porous cover layers on the negative electrode, are taken in order to prevent too strong an effect of the water molecules upon the alkali metal.

Nevertheless the processes, both at the alkali metal electrode and at the positive depolarizer electrode are characterized by a high degree of irreversibility. This manifests itself through gas evolution and heat production.

If one analyzes an $Li/H_2O_2$ it is found that the actual current-producing reaction can be expressed by the equation $$Li + \tfrac{1}{2}H_2O_2 \rightarrow LiOH \text{ (+heat+electrical energy)} \quad (1)$$

In addition, parasitic reactions take place which are not electrochemically useful, namely $$Li + H_2O \rightarrow LiOH + \tfrac{1}{2}H_2 \text{ (corrosion)} \quad (2)$$

$$H_2O_2 \rightarrow H_2O + \tfrac{1}{2}O_2 \text{ (decomposition)} \quad (3)$$

If there is no oxidant present such as $H_2O_2$ or $O_2$, then $H_2O$ necessarily becomes the depolarizer, whereby the reduction of the water liberates additional hydrogen.

$$H_2O + E^- \rightarrow OH^- + \tfrac{1}{2}H_2 \quad (4)$$

Thus the operation of an aqueous galvanic high energy cell is not problem free. Nevertheless, determined efforts are being made currently to find suitable fields of application for the above-mentioned electrochemical system, for example, as the energy source for ship propulsion. The theoretical rest potential of a $Li/H_2O_2$ cell is 3.92 volts, and the energy density relative to lithium is 15,150 wh/kg.

Accordingly it is an object of the invention to provide not only the means for safely eliminating the cell gases, but also for technically utilizing the energy which is inherent particularly in the hydrogen.

This and other objects are achieved in accordance with the invention by supplying the $H_2/O_2$ gas mixture which is evolved in the high energy cell, if desired with addition of oxygen, to the positive electrode of a fuel cell and from there if appropriate with separation of excess hydrogen, further to the negative electrode of the fuel cell.

In essence, the technique embodying the invention involves recombining the cell gasses with simultaneous recovery of electrical energy. The type of fuel cell which is particularly suitable for this recombination is the low pressure oxyhydrogen gas cell. In its modern form, this type of cell utilizes a positive electrode of sintered nickel with a separate catalyst for the oxygen reduction. As the negative electrode for the oxidation of the hydrogen there is suitable, for example, a double skeleton catalyst electrode sintered of a carbonyl nickel and highly active Raney nickel powder, of the type described in German Pat. No. 1,019,361. Both electrodes are preceded by a gas chamber for the supply and distribution of the hydrogen, or oxygen, respectively. The electrolyte located between the double skeleton electrodes is preferably caused to circulate.

In addition to these fuel cell electrodes, however, other electrodes working in unpressurized manner and based on nickel grids and catalyzed carbon powder can be used.

In principle, one can proceed in accordance with the invention in such a manner that the gas mixture leaving the lithium cell is supplied first to the $O_2$ electrode of the fuel cell. There, the oxygen is largely removed and the remaining gas then enters the $H_2$ electrode of the fuel cell. The operation of the fuel cell permits only a chemical reaction of $H_2$ and $O_2$ in the stoichiometric proportions of water. If $H_2$ is available in excess, this excess is not reactable and must be expelled at the outlet of the fuel cell like inert gas. If, on the other hand, $O_2$ is present in excess, This excess oxygen also reaches the $H_2$ electrode of the fuel cell. It is a property of all $H_2$ electrodes that they also electrochemically react $O_2$ in short circuit. This excess $O_2$ is consumed at the $H_2$ electrode. Of course, this phenomenon reduces the effectiveness of the electrochemical energy reaction of the gas mixture in the fuel cell.

In a preferred embodiment of the invention, measures are therefore taken to supply the operating gases hydrogen and oxygen to the fuel cell in optimum relationship, that is in the stoichiometric proportions of water.

In the event of an $H_2$ excess, this can be done most simply by introducing into the gas mixture flowing to the $O_2$ electrode additional air or, if desired, $O_2$ derived from peroxide decomposition.

In case of $O_2$ excess, on the other hand, this is separated from the gas mixture so that only pure $H_2$ reaches the negative fuel cell electrode. As a particularly desirable means for such separation, it has been found in accordance with the invention that there can be used an electrochemical cell which is based on the principle of an $O_2/O_2$ gas chain and here operates as a "cleaning cell".

For further details reference is made to the accompanying drawings wherein

Figure 1:
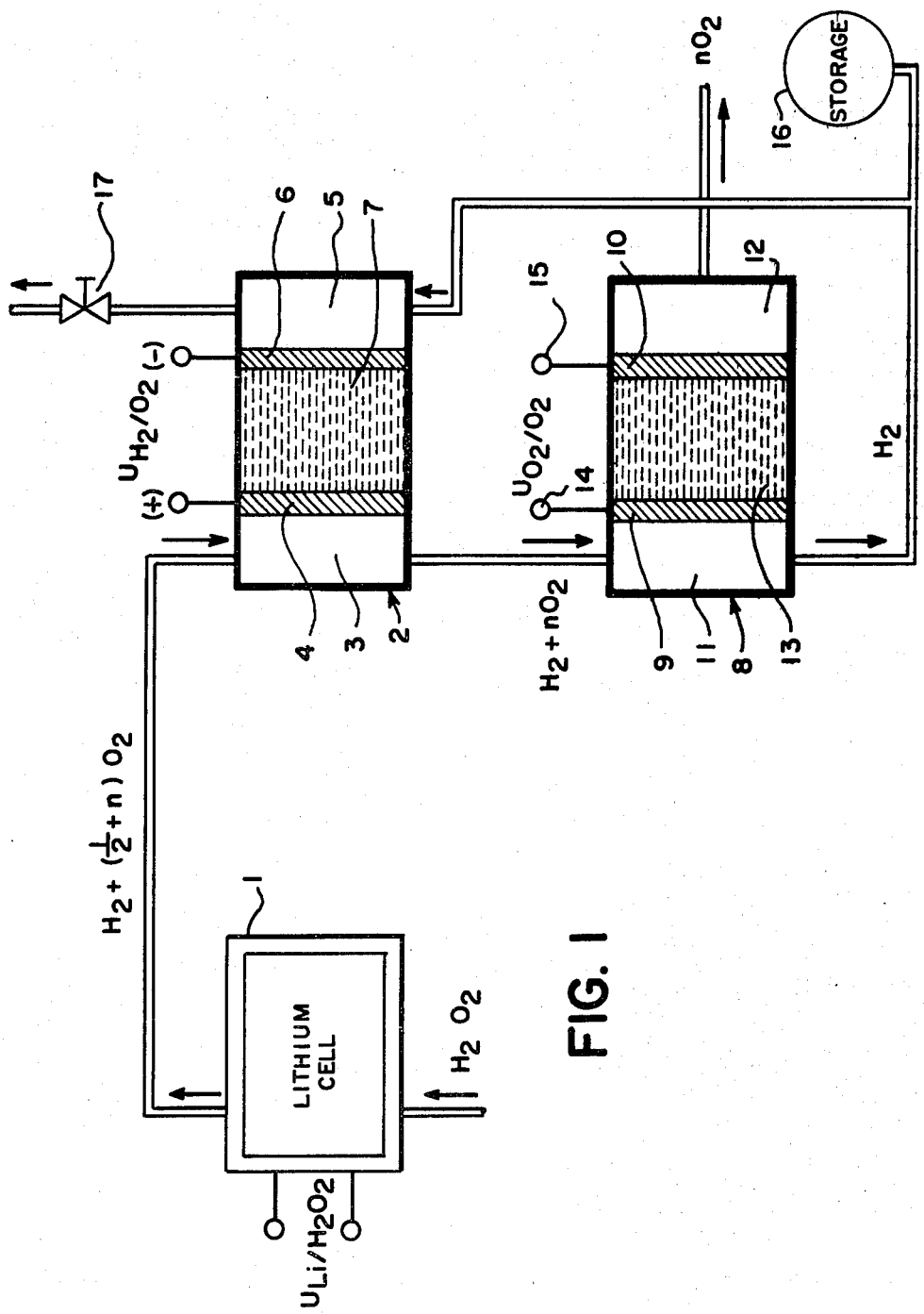
FIG. 1 is an overall illustration of the present invention.

In FIG. 1, the aqueous Li cell 1 which is equipped with $H_2O_2$ as oxidant, functions at an operating voltage $U_{Li}/H_2O_2$ of 2.0 to 2.6 volts, depending upon the load. The gas which escapes from the lithium cell contains, per mole of $H_2O$, an $O_2$ excess n which exceeds $\tfrac{1}{2}$ mole $O_2$. This gas mixture is led through gas chamber 3 to the $O_2$ electrode 4 of fuel cell 2. There, with simultaneous supply of 1 mole $H_2$ to the negative fuel cell electrode 6 with gas chamber 5, $\tfrac{1}{2}$ mole $O_2$ is reacted into $H_2O$. Electrolyte 7 is located between the two electrodes.

However, in the positive electrode, $H_2$ behaves like an inert gas. When it leaves the gas chamber 3 of the positive fuel cell electrode and is supplied to the cleaning cell 8, it is still contaminated by n moles $O_2$ per mole. This cell 8 consists of two similar porous electrodes 9 and 10 of inert metal, similar to those of the fuel cell. The cleaning cell also contains gas chambers 11 and 12 ahead of the electrodes, as well as an electrolyte 13. A voltage is applied to terminals 14 and 15, terminal 14 being the negative terminal. At electrode 9, there is then reduced oxygen, diffused into it from without in accordance with the formula $$\tfrac{1}{2}O_2 + H_2O + 2e^- \rightarrow 2OH^-, \tag{5}$$

and at electrode 10, it is further separated through oxidation $$2OH^- \rightarrow H_2O + \tfrac{1}{2}O_2 + 2e^-. \tag{6}$$

Such a cell represents, so to speak, the inverse of an $O_2/O_2$ gas chain, which upon being supplied with $O_2$ at one of the electrodes, delivers a potential which depends upon the pressure difference of the gas in the two electrode chambers.

If then the hydrogen contaminated with $O_2$ flows into gas chamber 11 of the cleaning cell and if this is energized with a voltage between 0.3 and 1 volt, then oxygen consumption occurs at the negative electrode 9 (cathode). Given a sufficient potential, which of course depends upon the type of electrode materials used and also on the catalyst, a limiting current develops, which is determined by the consumption without residue of the $O_2$ contained in the $H_2$.

Whereas the excess n moles $O_2$ simply escape to the outside from separating electrode 10, the purified $H_2$ leaves the cleaning cell and is then ducted via gas chamber 5 to the negative electrode 6 of the fuel cell. From it, there can be derived energy at a terminal voltage $U_{H_2/O_2}$ of about 0.9 volts.

Preferably, a gas storage means 16 is connected to the $H_2$ ducting path between the cleaning cell 8 and the gas chamber 5 ahead of the negative fuel cell electrode. This serves to retain temporary excessively high $H_2$ supply, and to make up a shortfall which may arise due to transport losses.

If air is added to the gas mixture escaping from the lithium cell in case of oxygen deficiency, then nitrogen is entrained as an inert gas. This can be removed at the end of the ducting path via valve 17 (FIG. 1).

An important advantage of the technique embodying the invention is that establishment of the necessary stoichiometry of the gas mixture for the fuel cell operation is accomplished solely by means of the $O_2$ component. This can also be expelled unused, in the event of excess from the cleaning cell, because it is available from the air in unlimited quantity. In contrast, the hydrogen which is delivered in limited quantities from the lithium cell is fully utilized.

Figure 2:
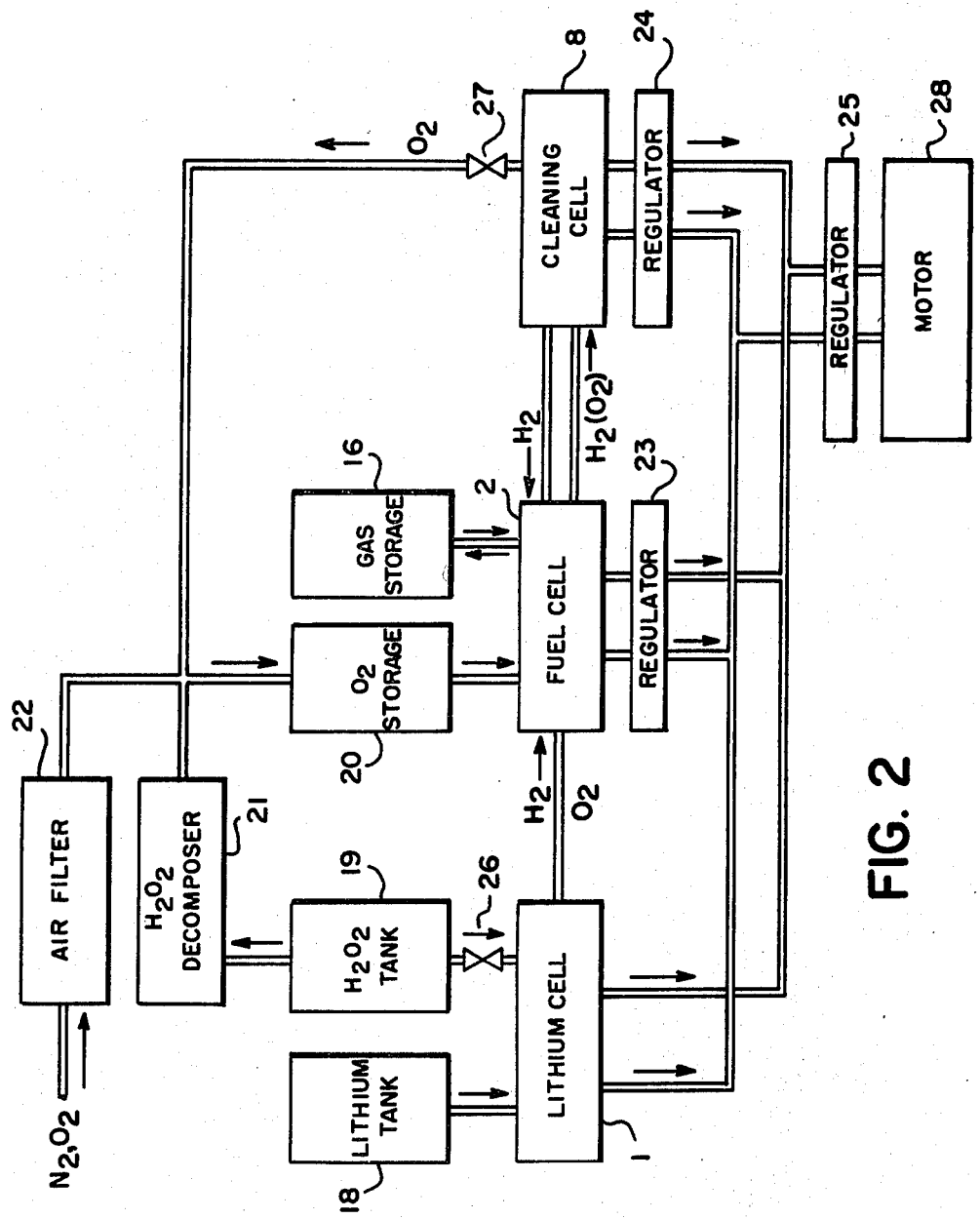
FIG. 2 is a diagrammatic illustration of the invention in the form of a closed energy supply system.

The operating principles illustrated in FIG. 1 can also be extended to advantage to encompass a cell operation in which the oxygen which had heretofore been discarded after separation in the cleaning cell is also resupplied to the fuel cell. In this way a completely closed circulatory system is created as illustrated in FIG. 2. Such a system is suitable for installation in enclosed spaces, particularly in undersea vehicles.

The lithium high energy cell 1, the fuel 2, the cleaning cell 8 and the gas storage means 16 for $H_2$ correspond to those in FIG. 1. For continuous supply of the high energy cell 1 there is provided a lithium tank 18 and an $H_2O_2$ tank 19. The excess $O_2$ separated from the gas mixture in the cleaning cell is not allowed to escape but is ducted back to the fuel cell 2 via $O_2$ storage means 20. In the same storage means there is also collected $O_2$ coming from the $H_2O_2$ decomposer 21 or air brought in from the outside via carbonate filter 22, depending upon the requirements of the operation. The gas storage means 16 for $H_2$ is preferably a hydride storage unit.

The closed energy production system is completed by regulating instruments 23, 24, 25, and valves 26, 27, and a motor 28 constituting the load.

A remarkable property of this system is that the lithium cell can be operated either under high load or, in case of reduced demand, under moderate load. Valve 26 permits such an extensive reduction of $H_2O_2$ supply from tank 19 that the lithium cell 1 is practically forced to operate with pure water as cathode depolarizer ($H_2O$ operation). Nevertheless it continues to operate, although at a voltage which is reduced by about 0.8 volts relative to full $H_2O_2$ operation.

During $H_2O$ operation, the gas which evolves in the lithium cell 1 in accordance with equation 4 consists exclusively of $H_2$, so that the $O_2$ cleaning can be omitted. In its place, the storage means 20 assumes the function of $O_2$ supply for the fuel cell 2. Simultaneously, the increased $H_2$ supplied from the lithium cell makes possible refilling of the hydride storage means 16.

Reduction of the $H_2O_2$ supply to the lithium cell 1 has as its consequence a reduction of the limiting current in the cleaning cell, due to the reduction of $O_2$ concentration in the gas mixture which is associated therewith. The change in limiting current therefore can be utilized as the control parameter for the $H_2O_2$ supply valve 26. This opens increasingly, in proportion to the reduction in the limiting current due to lack of $O_2$ supply.

I claim:

1. A method of operating an aqueous galvanic high energy cell in conjunction with a fuel cell, the high energy cell having electrodes of lithium, aluminum, or an Li/Al alloy, and having $H_2O_2$ as cathode depolarizer, said method comprising
    supplying the $H_2/O_2$ gas mixture developed in the high energy cell to the positive electrode of the fuel cell, and from there to the negative electrode of the fuel cell, and
    separating a quantity of excess oxygen from the gas mixture supplied to the negative electrode of the fuel cell which substantially equals the excess amount of oxygen above the stoichiometry of water, by means of an $O_2/O_2$ cell functioning as a cleaning cell.

2. The method of claim 1, further comprising
    adding oxygen to the $H_2/O_2$ gas mixture supplied to the positive fuel cell electrode.

3. The method of claim 1, further comprising
    adding hydrogen to the $H_2/O_2$ gas mixture supplied to the negative electrode of the fuel cell.

4. The method of claim 2, wherein
    the added oxygen quantity substantially equals the shortfall of oxygen below the stoichiometry of water in the gas mixture.

5. The method of claim 1, wherein
    a limiting current determined by consumption of $O_2$ without residue in the cleaning cell is utilized as the controlling parameter for the $H_2/O_2$ supply to the high energy cell.

6. A system for performing the method of claim 1, wherein the high energy cell is followed by a fuel cell having a positive and a negative electrode and means for supplying the gas mixture developed in the high energy cell to the positive fuel cell electrode, and further including a cleaning cell for separating excess oxygen, which cell operates in accordance with the principle of an $O_2/O_2$ gas chain, and means for supplying unconsumed gas from said positive fuel cell electrode to said cleaning cell and hydrogen separated by said cleaning cell to the negative fuel cell electrode.

7. The system of claim 6, further comprising a dosage valve for the $H_2/O_2$ supplied to the high energy cell, said dosage valve being controlled by the limiting current flowing in the cleaning cell.

8. The system of claim 7, wherein gas storage means for hydrogen and/or oxygen are provided in the path of movement from the cleaning cell to the fuel cell.

9. The system of claim 8, wherein the storage means for hydrogen is a hydride storage unit.

* * * * *